(12) United States Patent
Hasegawa

(10) Patent No.: US 11,489,202 B2
(45) Date of Patent: Nov. 1, 2022

(54) ELECTROLYTE SOLUTION FOR LITHIUM ION SECONDARY BATTERY AND LITHIUM ION SECONDARY BATTERY USING SAME

(71) Applicant: NEC Corporation, Tokyo (JP)

(72) Inventor: Takuya Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 16/613,871

(22) PCT Filed: May 9, 2018

(86) PCT No.: PCT/JP2018/017863
§ 371 (c)(1),
(2) Date: Nov. 15, 2019

(87) PCT Pub. No.: WO2018/212027
PCT Pub. Date: Nov. 22, 2018

(65) Prior Publication Data
US 2020/0106134 A1 Apr. 2, 2020

(30) Foreign Application Priority Data

May 18, 2017 (JP) .............................. JP2017-098996

(51) Int. Cl.
| H01M 10/0568 | (2010.01) |
| H01M 4/134 | (2010.01) |
| H01M 4/505 | (2010.01) |
| H01M 4/525 | (2010.01) |
| H01M 10/0525 | (2010.01) |
| H01M 10/0567 | (2010.01) |
| H01M 10/0569 | (2010.01) |
| H01M 10/058 | (2010.01) |
| H01M 4/02 | (2006.01) |

(52) U.S. Cl.
CPC ....... *H01M 10/0568* (2013.01); *H01M 4/134* (2013.01); *H01M 4/505* (2013.01); *H01M 4/525* (2013.01); *H01M 10/058* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2300/0005* (2013.01); *H01M 2300/0034* (2013.01); *H01M 2300/0051* (2013.01)

(58) Field of Classification Search
None
See application file for complete search history.

(56) References Cited

U.S. PATENT DOCUMENTS

| 2007/0015062 | A1 | 1/2007 | Lee et al. | |
| 2009/0130567 | A1* | 5/2009 | Segawa | H01G 9/038 |
| | | | | 429/335 |
| 2010/0255356 | A1* | 10/2010 | Fujii | H01G 11/06 |
| | | | | 429/94 |
| 2012/0214073 | A1 | 8/2012 | Iwaya et al. | |
| 2013/0065136 | A1* | 3/2013 | Sasaki | H01M 4/505 |
| | | | | 429/332 |
| 2016/0359197 | A1* | 12/2016 | Watarai | H01M 4/505 |
| 2017/0141440 | A1* | 5/2017 | Shimanuki | H01M 4/587 |
| 2018/0351199 | A1* | 12/2018 | Maeda | H01M 4/58 |

FOREIGN PATENT DOCUMENTS

| CN | 101847744 A | 9/2010 |
| CN | 102598390 A | 7/2012 |
| CN | 105826608 A | 8/2016 |
| CN | 105826807 A | 8/2016 |
| CN | 106030889 A | 10/2016 |
| CN | 106463775 A | 2/2017 |
| CN | 106663837 A | 5/2017 |
| EP | 2495797 A1 | 9/2012 |
| JP | 2012-074135 A | 4/2012 |
| JP | 2015-103361 A | 6/2015 |
| WO | 2011/118387 A1 | 9/2011 |
| WO | 2012/132152 A1 | 10/2012 |
| WO | 2013/122146 A1 | 8/2013 |
| WO | 2014/181877 A1 | 11/2014 |
| WO | 2015/129748 A1 | 9/2015 |
| WO | 2015/194559 A | 12/2015 |
| WO | 2015194560 A1 | 12/2015 |
| WO | 2016/010090 A1 | 1/2016 |
| WO | WO 2017/094416 | * 6/2017 |

OTHER PUBLICATIONS

International Search Report for PCT/JP2018/017863 dated Aug. 7, 2018 [PCT/ISA/210].
Written Opinion for PCT/JP2018/017863 dated Aug. 7, 2018 [PCT/ISA/237].
Chinese Office Action for CN Application No. 201880032819.2 dated Apr. 2, 2022 with English Translation.

* cited by examiner

*Primary Examiner* — Anca Eoff
(74) *Attorney, Agent, or Firm* — Sughrue Mion, PLLC

(57) ABSTRACT

An electrolyte solution capable of constituting a secondary battery in which a volume change due to charge and discharge is small and cycle characteristics are excellent is provided. The present example embodiment relates to an electrolyte solution for a lithium ion secondary battery comprising a fluorinated ether and a cyclic dicarboxylic acid ester.

19 Claims, 2 Drawing Sheets

ELECTROLYTE SOLUTION FOR LITHIUM ION SECONDARY BATTERY AND LITHIUM ION SECONDARY BATTERY USING SAME

CROSS REFERENCE TO RELATED APPLICATIONS

This application is a National Stage of International Application No. PCT/JP2018/017863 filed May 9, 2018, claiming priority based on Japanese Patent Application No. 2017-098996 filed May 18, 2017.

TECHNICAL FIELD

The present invention relates to an electrolyte solution for a lithium ion secondary battery, a secondary battery comprising the same, a method for producing the same and an assembled battery and a vehicle comprising the lithium ion secondary battery.

BACKGROUND ART

Lithium ion secondary batteries have advantages such as high energy density, low self-discharge, excellent long-term reliability and the like, and therefore they have been put into practical use in notebook-type personal computers, mobile phones and the like. Furthermore, in recent years, in addition to high functionality of electronic devices, by expansion of the market for motor-driven vehicles such as electric vehicles and hybrid vehicles, and acceleration of development of home and industrial power storage systems, development of a high performance lithium ion secondary battery which is excellent in battery characteristics such as cycle characteristics and storage characteristics and further improved in capacity and energy density has been demanded.

In order to improve the battery characteristics of the lithium ion secondary battery, various studies about the composition of the electrolyte solution and the like have been made. For example, Patent Document 1 describes an electrolyte solution comprising a fluorine-containing ether. Patent Documents 2 to 4 respectively describe an electrolyte solution containing a cyclic dicarboxylic acid ester represented by a predetermined formula.

Silicon materials and the like have attracted attention as negative electrode active materials having high capacity. While these electrode active materials have high capacities, the expansion and contraction of the active materials during absorbing and desorbing lithium ions is large. Due to the change in volume, the negative electrode active material particles collapse during repeated charge and discharge, resulting in that the new active surface is exposed. This active surface has had a problem of decomposing the electrolyte solvent and deteriorating the cycle characteristics of the battery. In addition, when the expansion and contraction due to charge and discharge is large, it is necessary to provide an extra volume in the outer package of the lithium ion secondary battery in advance, which causes a problem that the volume energy density is lowered.

CITATION LIST

Patent Document

Patent Document 1: Japanese Patent Laid-Open Publication No. 2012-074135
Patent Document 2: Japanese Patent Laid-Open Publication No. 2015-103361
Patent Document 3: WO 2015/194559
Patent Document 4: WO 2015/194560

SUMMARY OF INVENTION

Technical Problem

However, in the secondary battery using the electrolyte solution described in Patent Documents 1 to 4, the suppression of the volume change due to expansion and contraction of the negative electrode active material or the like during charge and discharge has been still insufficient, and thus there has still remained a problem that the cycle characteristics of the secondary battery are easily deteriorated.

The present invention has been made in consideration of the problems, and an object of the present invention is to provide an electrolyte solution capable of constituting a secondary battery in which a volume change due to charge and discharge is small and cycle characteristics are excellent.

Solution to Problem

One aspect of the present example embodiment relates to an electrolyte solution for a lithium ion secondary battery comprising a fluorinated ether and a cyclic dicarboxylic acid ester.

Advantageous Effect of Invention

According to the present invention, a secondary battery having an excellent cycle characteristics such as capacity retention ratio and the like.

DESCRIPTION OF EMBODIMENTS

Figure 1:
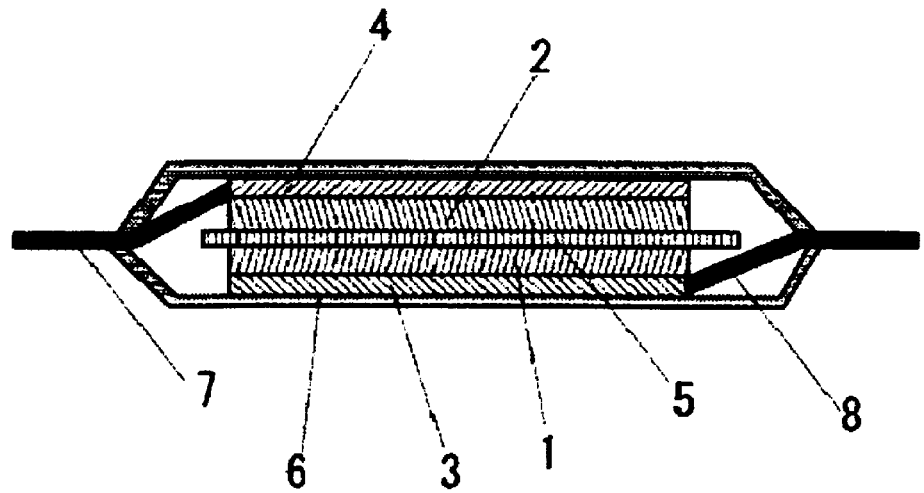
FIG. 1 is a schematic sectional view of a secondary battery according to one embodiment of the present invention.

The electrolyte solution for a lithium ion secondary battery (simply referred to as an "electrolyte solution") and a lithium ion secondary battery comprising the same (simply referred to as a "secondary battery") according to the present example embodiment will be described for each constituting member. In this specification, the term "cycle characteristics" means the characteristics such as capacity retention ratio after repeating charge and discharge.

Electrolyte Solution

The electrolyte solution of the present example embodiment comprises a fluorinated ether as an electrolyte solvent and a cyclic dicarboxylic acid ester as an additive. The electrolyte solution further comprises a supporting salt.

(Fluorinated Ether)

The fluorinated ether preferably comprises a fluorinated ether represented by the following formula (1), and more preferably comprises a fluorinated ether represented by the formula (1-1).

$$R_1-O-R_2 \tag{1}$$

in formula (1), $R_1$ and $R_2$ represent each independently an alkyl group or a fluorinated alkyl group, and at least one of $R_1$ and $R_2$ represents a fluorinated alkyl group.

$$C_nH_{2n+1-l}F_l-O-C_mH_{2m+1-k}F_k \tag{1-1}$$

wherein n and m are each independently an integer of 1 to 6; l is an integer of 0 to 2n+1; k is an integer of 0 to 2m+1; and at least one of l and k is 1 or more.

Examples of the fluorinated ether compound represented by formula (1-1) include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,2,3,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl 1,1,2,2-tetrafluoroethyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyl) propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H, 1H,5H-octafluoropentyl 1,1,2,2-tetrafluoroethyl ether, 1H,1H,2'H-perfluorodipropyl ether, heptafluoropropyl 1,2,2,2-tetrafluoroethyl ether, 2,2,3,3,3-pentafluoropropyl-1,1,2,2-tetrafluoroethyl ether, ethyl nonafluorobutyl ether, methyl nonafluorobutyl ether, 1,1-difluoroethyl 2,2,3,3-tetrafluoropropyl ether, bis(2,2,3,3-tetrafluoropropyl) ether, 1,1-difluoroethyl 2,2,3,3,3-pentafluoropropyl ether, 1,1-difluoroethyl-1H,1H-heptafluorobutyl ether, 2,2,3,4,4,4-hexafluorobutyl-difluoromethyl ether, bis(2,2,3,3,3-pentafluoropropyl) ether, nonafluorobutyl methyl ether, bis(1H,1H-heptafluorobutyl) ether, 1,1,2,3,3,3-hexafluoropropyl-1H,1H-heptafluorobutyl ether, 1H,1H-heptafluorobutyl-trifluoromethyl ether, 2,2-difluoroethyl-1,1,2,2-tetrafluoroethyl ether, bis(trifluoroethyl) ether, bis(2,2-difluoroethyl) ether, bis(1,1,2-trifluoroethyl) ether, 1,1,2-trifluoroethyl-2,2,2-trifluoroethyl ether, bis(2,2,3,3-tetrafluoropropyl) ether and the like.

Among these, from the viewpoint of voltage resistance and boiling point, at least one fluorinated ether selected from the group consisting of 1,1,2,2-tetrafluoroethyl-2,2,3,3-tetrafluoropropyl ether, ethyl 1,1,2,3,3,3-hexafluoropropyl ether, 2,2,3,4,4,4-hexafluorobutyl-difluoromethyl ether, 1,1-difluoroethyl-2,2,3,3-tetrafluoropropyl ether, 1,1,2,3,3,3-hexafluoropropyl-2,2-difluoroethyl ether, 1,1-difluoroethyl-1H, 1H-heptafluorobutyl ether, 1H,1H,2'H,3H-decafluorodipropyl ether, bis(2,2,3,3,3-pentafluoropropy) ether, 1H,1H,5H-perfluoropentyl-1,1,2,2-tetrafluoroethyl ether, bis(1H,1H-heptafluorobutyl)ether, 1H,1H,2'H-perfluorodipropyl ether, 1,1,2,3,3,3-hexafluoropropyl-1H,1H-heptafluorobutyl ether, 1H-perfluorobutyl-1H-perfluoroethyl ether, and bis(2,2,3,3-tetrafluoropropyl)ether is preferably used.

The fluorinated ether compound may be used singly or in combination of two or more types thereof. In some cases, when two or more types of the fluorinated ether compounds are used in combination, the cycle characteristics of the secondary battery may be improved as compared with the case of using only one type.

The content of the fluorinated ether in the electrolyte solution is, but not particularly limited to, preferably 1 vol % or more, more preferably 10 vol % or more, and still more preferably 20 vol % or more, and preferably 80 vol % or less, more preferably 60 vol % or less, and still more preferably 50 vol % or less. When the content of the fluorinated ether in the electrolyte solution is 1 vol % or more, the oxidation resistance of the electrolyte solution becomes high and thereby the cycle characteristic is improved. When the content of the fluorinated ether in the electrolyte solution is 80 vol % or less, the ion conductivity of the electrolyte solution is good and thereby the charge and discharge rate characteristics of the secondary battery are excellent, and compatibility with other solvents is improved.

(Cyclic Dicarboxylic Acid Ester)

The cyclic dicarboxylic acid ester as an additive in the electrolyte solution is decomposed by electrochemical oxidation-reduction reactions during charge and discharge reactions to form films on surfaces of electrode active materials, and thereby the decompositions of the electrolyte solution and the supporting salt can be suppressed. This is considered to be effective in achieving a longer life of a lithium ion secondary battery. In addition, the cyclic dicarboxylic acid ester has two —C(=O)O— bonds in the molecule and thus it is assumed that the cyclic dicarboxylic acid ester compound has improved affinity for a negative electrode and is easily adsorbed. Furthermore, since the cyclic dicarboxylic acid ester has a ring structure, the cyclic dicarboxylic acid ester can undergo ring-opening during decomposition and polymerize on a negative electrode. Thus, it is not easily separated from the surface of the active material even if the expansion and contraction of the active material due to charge and discharge occurs, to form a stable film.

The cyclic dicarboxylic acid ester is not particularly limited, but preferably comprises at least one cyclic dicarboxylic acid ester selected from the group consisting of the following formula (2) and the following formula (3).

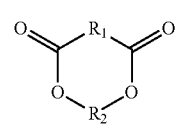

(2)

in formula (2), $R_1$ and $R_2$ each independently represent a single bond or a substituted or unsubstituted alkylene group having 1 to 5 carbon atoms which may be branched, with the proviso that both $R_1$ and $R_2$ do not represent single bonds at the same time.

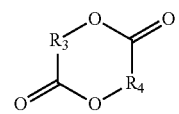

(3)

in formula (3), $R_3$ and $R_4$ each independently represent a single bond or a substituted or unsubstituted alkylene group having 1 to 5 carbon atoms which may be branched, with the proviso that both $R_3$ and $R_4$ do not represent single bonds at the same time.

The cyclic dicarboxylic acid ester represented by formula (2) or formula (3) is, but not particularly limited to, preferably a five-membered to seven-membered ring compound and more preferably a five-membered ring or a 6-membered ring compound.

First, the cyclic dicarboxylic acid ester represented by formula (2) will be described.

In the formula (2), $R_1$ and $R_2$ each independently represent a single bond or a substituted or unsubstituted alkylene group having 1 to 5 carbon atoms, with the proviso that both $R_1$ and $R_2$ do not represent single bonds at the same time.

In the formula (2), the alkylene group may be either a straight chain or a branched chain. In the case of a straight chain, the alkylene group is represented by —$(CH_2)_n$— (n is an integer of 1 to 5) and preferred is —$(CH_2)_n$— (n is an integer of 1 to 3).

In the branched alkylene group, at least one hydrogen atom of the alkylene group represented by —$(CH_2)_n$— (n is an integer of 1 to 4) is substituted with an alkyl group. Examples of the branched alkylene group include —CH($C_mH_{2m+1}$)— (m is an integer of 1 to 4), —$CH_2$—CH($CH_3$)—, —$CH_2$—CH($C_2H_5$)—, —$CH_2$—CH($C_3H_7$)—, —CH($CH_3$)—CH($CH_3$)—, —CH($CH_3$)$CH_2CH_2$—, —CH($CH_3$)$CH_2CH_2CH_2$—, —CH[CH($CH_3$)$_2$]— and —CH[C($CH_3$)$_3$]—, and preferred are —CH($C_mH_{2m+1}$)— (m is an integer of 1 to 4), —$CH_2$—CH($CH_3$)—, —CH($CH_3$)—CH($CH_3$)—, —CH($CH_3$)$CH_2CH_2$—, and —CH($CH_3$)$CH_2CH_2CH_2$—. The branched chain is more preferably a methyl group.

$R_1$ and $R_2$ each independently may have a substituent group, examples of the substituent group may include a halogen atom such as a fluorine atom, a chlorine atom, a bromine atom and the like, and preferred is a fluorine atom. For example, when $R_1$ or $R_2$ is a fluoroalkylene group having a fluorine atom, the fluoroalkylene group means the group wherein at least one hydrogen atom of the alkylene group is substituted with a fluorine atom and all hydrogen atoms may be substituted with fluorine atoms. The substitution position and the substitution number of fluorine atoms are arbitrary.

In the formula (2), $R_1$ is preferably a single bond or a straight alkylene group, preferably a single bond, a methylene group or an ethylene group, and more preferably a single bond. $R_2$ is preferably a straight chain alkylene group or a branched chain alkylene group. In the case of a straight alkylene group, —$(CH_2)_n$— (n is an integer of 1 to 3) is preferable and an ethylene group is more preferable. In the case of a branched alkylene group, it preferably has a methyl group as an branched chain, and for example, —CH($CH_3$)—, —$CH_2$—CH($CH_3$)—, and —CH($CH_3$)—CH($CH_3$)— are preferable.

In the formula (2), it may be preferred that $R_1$ and $R_2$ are different from each other in some cases because the cyclic dicarboxylic acid ester represented by the formula (2) is easily decomposed to easily form a film on the surface of the electrode.

As one embodiment of the compound represented by the formula (2), a compound represented by the formula (2-1) is preferable, a six-membered ring compound represented by the formula (2-2) is more preferable and a compound represented by the formula (2-3) (1,4-dioxane-2,5-dione) is further preferable.

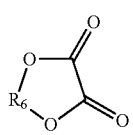

(2-1)

wherein in the formula (2-1), $R_6$ represents a substituted or unsubstituted alkylene group having 1 to 5 carbon atoms which may be branched.

In the formula (2-1), $R_6$ preferably represents an unsubstituted alkylene group having 1 to 5 carbon atoms which may be branched.

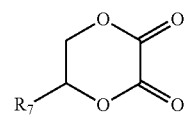

(2-2)

wherein in the formula (2-2), $R_7$ represents a hydrogen atom or a substituted or unsubstituted alkyl group having 1 to 3 carbon atoms which may be branched.

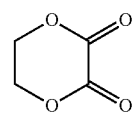

(2-3)

Next, the compound represented by formula (3) will be described.

In formula (3), $R_3$ and $R_4$ each independently represent a single bond or a substituted or unsubstituted alkylene group having 1 to 5 carbon atoms which may be branched, with the proviso that both $R_3$ and $R_4$ do not represent single bonds at the same time.

$R_3$ and $R_4$ may be the same as or different from each other. In some cases, when $R_3$ and $R_4$ are different groups, the compound may be easily decomposed to easily form a film on the surface of the electrode as compared with the case where $R_3$ and $R_4$ are the same groups.

In formula (3), the alkylene group may be either a straight chain or a branched chain. In the case of a straight chain, the alkylene group is represented by —$(CH_2)_n$— (n is an integer of 1 to 5), is preferably represented by —$(CH_2)_n$— (n is an integer of 1 to 3) and is more preferably a methylene group. In the case of the branched alkylene group, at least one hydrogen atom of the alkylene group represented by —$(CH_2)_n$— (n is an integer of 1 to 4) is substituted with an alkyl group. Example of the branched alkylene group include —CH($C_mH_{2m+1}$)— (m is an integer of 1 to 4), —$CH_2$—CH($CH_3$)—, —$CH_2$—CH($C_2H_5$)—, —$CH_2$—CH($C_3H_7$)—, —CH($CH_3$)—CH($CH_3$)—, —CH($CH_3$)$CH_2CH_2$—, —CH($CH_3$)$CH_2CH_2CH_2$—, —CH[CH($CH_3$)$_2$]— and —CH[C($CH_3$)$_3$]—; and preferred is —CH($C_mH_{2m+1}$)— (m is an integer of 1 to 3).

$R_3$ and $R_4$ each independently may have a substituent group, examples of the substituent group may include a halogen atom such as a fluorine atom, a chlorine atom, a bromine atom and the like; and a fluorine atom is preferable. For example, $R_3$ or $R_4$ is fluoroalkylene group having a fluorine atom, the fluoroalkylene group means the group wherein at least one hydrogen atom of the alkylene group is substituted with a fluorine atom and all hydrogen atoms may be substituted with fluorine atoms. The substitution position and the substitution number of fluorine atoms are arbitrary.

In the formula (3), it is preferable that one of $R_3$ and $R_4$ is a single bond or a straight alkylene group and the other is a branched alkylene group, and it is more preferable that one is a single bond and the other is a branched alkylene group.

As the compound represented by the formula (3), a compound represented by the following general formula (3-1) is preferable and a compound represented by the following formula (3-2) (5-methyl-1,3-dioxolane-2,4-dione, also described as "5MDD") is more preferable.

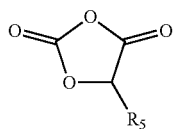
(3-1)

wherein in the formula (3-1), $R_5$ represents a hydrogen atom or a substituted or unsubstituted alkyl group having 1 to 4 carbon atoms.

In the formula (3-1), $R_5$ preferably represents a hydrogen atom or an unsubstituted alkyl group having 1 to 4 carbon atoms.

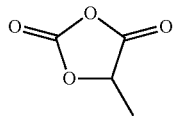
(3-2)

Examples of the cyclic dicarboxylic acid ester compound represented by the general formula (2) or (3) include the compounds shown in Table 1, 1,4-dioxane-2,5-dione, 3,6-dimethyl-1,4-dioxane-2,5-dione and the like, but are not limited to these compounds.

TABLE 1

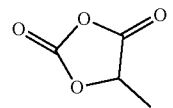

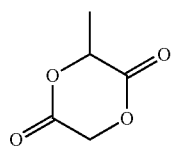

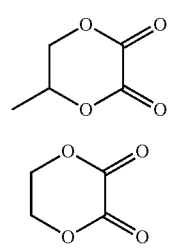

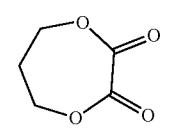

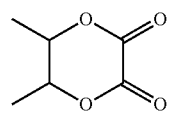

TABLE 1-continued

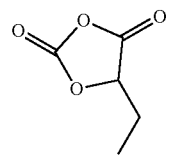

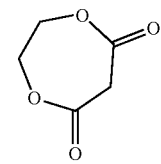

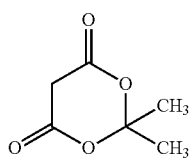

Among these, 5-methyl-1,3-dioxolane-2,4-dione is particularly preferable. The cyclic dicarboxylic acid ester may be used singly or in combination of two or more types thereof.

The content of the dicarboxylic acid ester in the electrolyte solution is, but not particularly limited to, preferably 0.1 mass % or more and more preferably 0.5 mass % or more, and preferably 5 mass % or less and more preferably 3 mass % or less. When the content of the dicarboxylic acid ester in the electrolyte solution is 0.1 mass % or more, films can be effectively formed on an electrode, and as a result, the decomposition of the nonaqueous solvent can be effectively suppressed. When the content is 5 mass % or less, an increase in the internal resistance of a battery due to excessive growth of an SEI film can be effectively suppressed.

The present inventors have found that when the electrolyte solution comprises the fluorinated ether and the cyclic dicarboxylic acid ester in combination, the volume change during charge and discharge of the lithium ion secondary battery can be suppressed, and as a result, a secondary battery being excellent in cycle characteristics can be obtained. Particularly, in a lithium ion secondary battery having a negative electrode comprising a silicon material, the effect can be remarkably exhibited by using the electrolyte solution of the present example embodiment.

As one preferred aspect of the present example embodiment, when the electrolyte solution comprising 1,1,2,2-tetrafluoroethyl-2,2,3,3-tetrafluoropropyl ether and 5-methyl-1,3-dioxolane-2,4-dione (5MDD) is used, the lithium ion secondary battery in which the volume change is suppressed, the increase in resistance is small, and cycle characteristics are very excellent can be obtained.

The electrolyte solution of the present example embodiment may contain other nonaqueous solvents and/or additives in addition to the above-mentioned fluorinated ethers and cyclic dicarboxylic acid esters.

The nonaqueous solvent comprises in addition to the fluorinated ether, preferably at least one selected from cyclic carbonates and open-chain carbonates, and more preferably at least a cyclic carbonate.

The cyclic carbonate is not particularly limited, but for example, a compound having a ring formed by bonding two oxygen atoms of a carbonate group of —O—C(=O)—O— with a hydrocarbon group such as an alkylene group or an alkenylene group may be used. The carbon number of the hydrocarbon group is preferably 1 or more and 7 or less, more preferably 2 or more and 4 or less.

Examples of the cyclic carbonate compound include ethylene carbonate (EC), propylene carbonate (PC), butylene carbonate (BC) and vinylene carbonate (VC). Among these, ethylene carbonate and propylene carbonate are preferable from the viewpoint of voltage resistance and electric conductivity. The cyclic carbonate may be used solely or in combination of two or more types thereof.

Since the cyclic carbonate has a large specific dielectric constant, when the electrolyte solution contains the cyclic carbonate, the dissociation property of the supporting salt is improved and sufficient electric conductivity is easily imparted. When the electrolyte solution contains the cyclic carbonate, there is an advantage that the ion mobility in the electrolyte solution is improved. However, gas generation amount tends to increase at a high voltage or at a high temperature in comparison with the fluorinated ether. On the other hand, there is also an effect of improving the life characteristics by forming a film on the negative electrode. Therefore, from the viewpoint of effects of enhancing a dissociation degree of the supporting salt and enhancing an electric conductivity of the electrolyte solution, the content of the cyclic carbonate in the nonaqueous electrolyte solution is preferably 5 vol % or more and more preferably 10 vol % or more, and preferably 90 vol % or less and more preferably 80 vol % or less.

In one aspect of the present example embodiment, the total content of the fluorinated ether and the cyclic carbonate in the total amount of the nonaqueous solvent is preferably 50 vol % or more, more preferably 70 vol % or more, still more preferably 90 vol % or more, and may be 100 vol %. The volume ratio represented by (volume of the fluorinated ether:volume of the cyclic carbonate) is preferably from 10:90 to 50:50.

As one aspect of the present example embodiment, the nonaqueous solvent of the electrolyte solution comprises from 50 vol % to 80 vol % of propylene carbonate and from 20 vol % to 50 vol % of the fluorinated ether. Particularly, propylene carbonate is preferable because it is excellent in rate characteristics at a low temperature.

The open-chain carbonate is not limited, but examples thereof include dimethyl carbonate (DMC), ethyl methyl carbonate (EMC), diethyl carbonate (DEC), dipropyl carbonate (DPC) and the like. Among these, dimethyl carbonate is preferable from the viewpoint of voltage resistance and electric conductivity. The open-chain carbonate can be used alone or in combination of two or more thereof.

The nonaqueous solvent may further comprise other solvents, for example, a cyclic sulfone compound, an open-chain sulfone compound, an open-chain carboxylic acid ester (including a fluorinated derivative thereof), a cyclic carboxylic acid ester (including a fluorinated derivative thereof), a cyclic ether (including a fluorinated derivative thereof), a phosphoric acid ester (including a fluorinated derivative thereof) and the like. Among these, it may be preferable to contain a fluorinated phosphoric acid ester in some cases.

The electrolyte solution may further comprise a fluorinated phosphoric acid ester as a nonaqueous solvent in addition to the fluorinated ether. By comprising a fluorinated phosphoric acid ester, compatibility of the fluorinated ether with other solvents such as carbonates can be improved.

As the fluorinated phosphoric acid ester, for example, a compound represented by the following formula (4) is preferable.

$$O=P(-O-R_1')(-O-R_2')(-O-R_3') \quad (4)$$

wherein in formula (4), $R_1'$, $R_2'$ and $R_3'$ each independently represent an alkyl group or a fluorinated alkyl group, and at least one of $R_1'$, $R_2'$ and $R_3'$ is a fluorinated alkyl group.}

In formula (4), the number of carbon atoms in the $R_1'$, $R_2'$ and $R_3'$ is each independently preferably 1 to 4.

In the present example embodiment, the total number of carbon atoms in the fluorinated phosphoric acid ester compound (the total number of carbon atoms in $R_1'$, $R_2'$ and $R_3'$) is preferably 4 or more and 15 or less, more preferably 4 or more and 10 or less, and further preferably 5 or more and 9 or less.

Examples of the fluorinated phosphoric acid ester compound include 2,2,2-trifluoroethyl dimethyl phosphate, bis (trifluoroethyl)methyl phosphate, bistrifluoroethyl ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris(2,2,2-trifluoroethyl) phosphate (hereinafter abbreviated as TTFEP), tris(1H,1H-heptafluorobutyl) phosphate, tris(1H,1H,5H-octafluoropentyl) phosphate and the like.

Among these, since the effect of suppressing decomposition of the electrolyte solution at high potential is high, preferably at least one selected from tris(2,2,2-trifluoroethyl) phosphate (PTTFE), tris(2,2,3,3,3-pentafluoropropyl) phosphate and tris(1H,1H-heptafluorobutyl) phosphate is comprised, and more preferably tris(2,2,2-trifluoroethyl) phosphate is comprised.

The content of the fluorinated phosphoric acid ester in the electrolyte solution is not particularly limited, but as one embodiment, for example, 15 vol % or more and 50 vol % or less is preferable, and 20 vol % or more and 35 vol % or less is more preferable.

(Supporting Salt)

The supporting salt is not particularly limited as long as it contains Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiB_{10}Cl_{10}$ and a compound represented by the following formula (a):

$$LiN(SO_2C_nF_{2n+1})_2 \text{ (n is an integer of 0 or more)} \quad \text{formula (a).}$$

Examples of the compound represented by the formula (a) include $LiN(FSO_2)_2$ (abbreviated as LiFSI), $LiN(CF_3SO_2)_2$, LiN(C$_2$F$_5$SO$_2$)$_2$. In addition, examples of other supporting salts include lithium lower aliphatic carboxylates, chloroborane lithium, lithium tetraphenylborate, LiBr, LiI, LiSCN, and LiCl. Among these, LiPF$_6$ and LiFSI are particularly preferable from the viewpoint of oxidation resistance, reduction resistance, stability, ease of dissolution and the like. The supporting salt may be used alone, or two or more supporting salts may be used in combination. The content of the supporting salt (the total content when plural supporting salts are comprised) in 1 L of an electrolyte solvent is preferably 0.4 mol/l or more and 1.5 mol/l or less, and more preferably 0.5 mol/l or more and 1.2 mol/l or less.

It is preferable to use LiFSI for at least a part of the supporting salt. LiFSI dissociates in the electrolyte solution and generates N(FSO$_2$)$_2$ anion (FSI anion). The FSI anion forms an SEI film on the negative electrode and the positive electrode that prevents the reaction between the active material and the electrolyte solution. Thereby, the capacity retention ratio after charge and discharge cycle is improved and gas generation can be suppressed. The amount of LiFSI is preferably 20 mol % or more and 80 mol % or less, more preferably 30 mol % or more and 70 mol % or less, based on the total amount of the supporting salt(s) containing Li.

In one aspect of the present example embodiment, the supporting salt preferably comprises LiPF$_6$ and/or LiFSI, and more preferably comprises both of LiPF$_6$ and LiFSI.

(Additive)

The electrolyte solution may comprise, as additives, other additives in addition to the above-mentioned 5MDD. Examples of other additives include a fluorinated cyclic carbonate such as 4-fluoro-1,3-dioxolan-2-one (FEC), a fluorinated open-chain carbonate, an unsaturated carboxylic acid anhydride, a fluorinated carboxylic acid anhydride, a cyclic or open-chain monosulfonic acid ester, and a cyclic or open-chain disulfonic acid ester. By adding these compounds, the cycle characteristics of the battery may be further improved in some cases. It is presumed that these additives are decomposed during charge and discharge of the lithium ion secondary battery to form a film on the surface of the electrode active material and suppress decompositions of the electrolyte solution and the supporting salt.

Positive Electrode

The positive electrode may have a structure in which a positive electrode active material layer comprising a positive electrode active material is formed on a current collector. A positive electrode of the present example embodiment comprises, for example, a positive electrode current collector formed of a metal foil and a positive electrode active material layer formed on one side or both sides of the positive electrode current collector. The positive electrode active material layer is formed so as to cover the positive electrode collector with a positive electrode binder. The positive electrode current collector is arranged to have an extended portion connected to a positive electrode terminal, and the positive electrode active material layer is not formed on the extended portion.

The positive electrode active material in the present example embodiment is not particularly limited as long as the material can absorb and desorb lithium, and may be selected from several viewpoints. From the viewpoint of achieving higher energy density, a high capacity compound is preferably contained. Examples of the high capacity compound include Li-rich layered positive electrode, lithium nickelate (LiNiO$_2$), and a lithium nickel composite oxide in which a part of the Ni of lithium nickelate (LiNiO$_2$) is replaced by another metal element, and a Li-rich layered positive electrode represented by the following formula (A1) and a layered lithium nickel composite oxide represented by the following formula (A2) are preferred.

$$\text{Li}(\text{Li}_x\text{M}_{1-x-z}\text{Mn}_z)\text{O}_2 \tag{A1}$$

wherein in formula (A1), 0.1≤x<0.3, 0.4≤z≤0.8, M is at least one of Ni, Co, Fe, Ti, Al, and Mg;

$$\text{Li}_y\text{Ni}_{(1-x)}\text{M}_x\text{O}_2 \tag{A2}$$

wherein in formula (A2), 0≤x<1, 0<y≤1, M is at least one element selected from the group consisting of Li, Co, Al, Mn, Fe, Ti, and B.

From the viewpoint of high capacity, it is preferred that the content of Ni is high, that is, x is less than 0.5, further preferably 0.4 or less in the formula (A2). Examples of such compounds include Li$_\alpha$Ni$_\beta$Co$_\gamma$Mn$_\delta$O$_2$ (0<α≤1.2, preferably 1≤α≤1.2, α+β+γ+δ=2, β≥0.7, and γ≤0.2) and Li$_\alpha$Ni$_\beta$Co$_\gamma$Al$_\delta$O$_2$ (0<α≤1.2, preferably 1≤α≤1.2, α+β+γ+δ=2, β≥0.6, preferably β≥0.7, and γ≤0.2) and particularly include LiNi$_\beta$Co$_\gamma$Mn$_\delta$O$_2$ (0.75≤β≤0.85, 0.05≤γ≤0.15, and 0.10≤δ≤0.20, β+γ+δ=1). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, and LiNi$_{0.8}$Co$_{0.1}$Al$_{0.1}$O$_2$ (also including those in which the content of each transition metal fluctuates by about 10% in these compounds) may be preferably used.

From the viewpoint of thermal stability, it is also preferred that the content of Ni does not exceed 0.5, that is, x is 0.5 or more in the formula (A2). In addition, it is also preferred that particular transition metals do not exceed half. Examples of such compounds include Li$_\alpha$Ni$_\beta$Co$_\gamma$Mn$_\delta$O$_2$ (0<α≤1.2, preferably 1≤α≤1.2, α+β+γ+δ=2, 0.2≤β≤0.5, 0.1≤γ0.4, and 0.1≤δ≤0.4). More specific examples may include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), and LiNi$_{0.5}$Co$_{0.3}$Mn$_{0.2}$O$_2$ (abbreviated as NCM532) (also including those in which the content of each transition metal fluctuates by about 10% in these compounds).

In addition, two or more compounds represented by the formula (A2) may be mixed and used, and, for example, it is also preferred that NCM532 or NCM523 and NCM433 are mixed in the range of 9:1 to 1:9 (as a typical example, 2:1) and used. Further, by mixing a material in which the content of Ni in formula (A2) is high (x is 0.4 or less) and a material in which the content of Ni in formula (A2) does not exceed 0.5 (x is 0.5 or more, for example, NCM433), a battery having high capacity and high thermal stability can also be formed.

As the positive electrode active material other than the above, for example, lithium manganates having a layered structure or a spinel structure, such as LiMnO$_2$, Li$_x$Mn$_2$O$_4$ (0<x<2), Li$_2$MnO$_3$, and Li$_x$Mn$_{1.5}$Ni$_{0.5}$O$_4$ (0<x<2); LiCoO$_2$, or materials in which a part of such transition metals is substituted with other metal(s); materials having Li in an excessive amount as compared with the stoichiometric composition in these lithium transition metal oxides; and materials having an olivine structure such as LiFePO$_4$ may be exemplified. Further, materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. Such positive electrode active materials described above may be used alone, or in combination of two or more thereof.

In one embodiment of the present example embodiment, a positive electrode active material having a spinel structure which operates at a potential of 4.5V or more versus lithium is preferable, a positive electrode active material represented by the following formula (B) is exemplified.

$$Li_a(M_xMn_{2-x-y}Y_y)(O_{4-w}Z_w) \quad (B)$$

wherein formula (B), 0.4≤x≤1.2, 0≤y, x+y<2, 0≤a≤1.2, preferably 0<a≤1.2, 0≤w≤1; M is a transition metal element and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one element selected from the group consisting of F and Cl.

Examples of a binder for positive electrode include, but are not limited to, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid and the like. Styrene-butadiene rubber (SBR) or the like may be used. When an aqueous binder such as an SBR emulsion is used, a thickener such as carboxymethyl cellulose (CMC) may also be used. The positive electrode binder may be used by mixing two or more kinds. From the viewpoint of a trade-off relationship between "sufficient binding force" and "high energy density", the amount of the binder used for the positive electrode is preferably 2 to 10 parts by mass based on 100 parts by mass of the positive electrode active material.

To the coating layer comprising the positive electrode active material, an electrically conductive auxiliary material may be added for the purpose of reducing the impedance. Examples of the electrically conductive auxiliary material include scaly or fibrous carbonaceous fine particles, such as graphite, carbon black, acetylene black, vapor grown carbon fiber and the like.

As the positive electrode current collector, from the viewpoint of electrochemical stability, aluminum, nickel, copper, silver, and alloys thereof are preferable. The shape thereof may be foil, flat plate, or mesh. In particular, a current collector using aluminum, an aluminum alloy, or iron-nickel-chromium-molybdenum based stainless steel is preferable.

The positive electrode may be prepared by forming the positive electrode active material layer comprising the positive electrode active material and the positive electrode binder on the positive electrode current collector. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof as a positive electrode current collector is formed thereon by a method such as vapor deposition or sputtering.

Negative Electrode

The negative electrode may have a structure in which a negative electrode active material layer comprising a negative electrode active material is formed on a current collector. A negative electrode of the present example embodiment comprises, for example, a negative electrode current collector formed of a metal foil and a negative electrode active material layer formed on one side or both sides of the negative electrode current collector. The negative electrode active material layer is formed so as to cover the negative electrode collector with a negative electrode binder. The negative electrode current collector is arranged to have an extended portion connected to a negative electrode terminal, and the negative electrode active material layer is not formed on the extended portion.

(Negative Electrode Active Material)

The negative electrode active material in the present example embodiment is not particularly limited as long as the material can absorb and desorb lithium. In the present example embodiment, the negative electrode active material preferably comprises a material comprising silicon having a high capacity as a constituent element (also referred to as a "silicon material"). Hereinafter, the silicon material will be described as one aspect of the present example embodiment, but the present invention is not limited thereto. In the present specification, a substance that does not absorb and desorb lithium, such as a binder, is not included in the negative electrode active material.

Examples of the silicon material include a metal silicon (elemental silicon), an alloy comprising silicon, and a silicon oxide represented by the formula: $SiO_x(0<x≤2)$, and the silicon material preferably comprise a silicon oxide.

The alloy comprising silicon may be an alloy of silicon and a metal other than silicon (non-silicon metal), and for example, an alloy of silicon and at least one selected from the group consisting of Li, B, Al, Ti, Fe, Pb, Sn, In, Bi, Ag, Ba, Ca, Hg, Pd, Pt, Te, Zn, and La is preferable, and an alloy of silicon and at least one selected from the group consisting of Li, B, Ti, and Fe is more preferable. The content of non-silicon metal in the alloy of silicon and a non-silicon metal is not particularly limited, but for example, the content thereof is preferably 0.1 to 5 mass %. Examples of the method for producing the alloy of silicon and a non-silicon metal include a method of mixing and melting elemental silicon and a non-silicon metal, and a method of coating the surface of elemental silicon with a non-silicon metal by vapor deposition or the like.

Part or all of the surface of silicon and a silicon alloy may be coated with silicon oxide.

The silicon material comprised in the negative electrode active material may be one kind or two or more kinds.

The content of the silicon material based on the total amount of the negative electrode active material is not particularly limited, but is preferably 5 mass % or more, more preferably 50 mass % or more, still more preferably 70 mass % or more, and may be 100 mass %. When the content of the silicon material is within the above range, the energy density of the lithium ion secondary battery is improved and cycle characteristics can be improved. The particle size of the silicon material is preferably 0.1 μm or more and 10 μm or less, and more preferably 0.2 μm or more and 8 μm or less. When the particle size is too small, reactivity with an electrolyte solution or the like becomes high, and thereby life characteristics may be deteriorated. When the particle size is too large, cracks of the particles easily occur during absorbing and desorbing Li and thereby the life may be deteriorated.

The negative electrode active material may comprise other negative electrode active material(s) in addition to the silicon material or instead of the silicon material. Examples of other negative electrode active materials include carbon materials or the like.

In one aspect of the present example embodiment, it is preferable that the negative electrode active material comprises carbon in addition to the silicon material. By using a silicon material together with carbon, the influence of expansion and contraction of silicon during absorbing and desorbing lithium ions can be reduced, and cycle characteristics of the battery can be improved. The silicon material and carbon may be mixed and used, and the surface of the silicon material may be coated with carbon to be used. Examples of carbon include graphite, amorphous carbon, graphene, diamond-like carbon, carbon nanotubes, and composites thereof. Here, graphite, which has high crystallinity, has high electric conductivity, excellent adhesiveness to an electrode collector formed of a metal such as copper, and excellent voltage flatness. In contrast, since amorphous carbon, which has low crystallinity, is relatively low in volume expansion, it is highly effective to reduce volume expansion of the entire negative electrode, and in addition, deterioration due to non-uniformity such as crystal grain boundary and defect hardly occurs. Although the content of the carbon material in the negative electrode active material is not particularly limited, 3 mass % or more is preferable and 5 mass % or more is more preferable, and 70 mass % or less is preferable and 60 mass % or less is more preferable.

Other negative electrode active materials that can be used in combination with the silicon material include metals other than silicon and metal oxides. Examples of the metal include Li, Al, Ti, Pb, Sn, In, Bi, Ag, Ba, Ca, Hg, Pd, Pt, Te, Zn, La, or alloys of two or more thereof. These metals or alloys may comprise one or more non-metallic elements. Examples of the metal oxide include aluminum oxide, tin oxide, indium oxide, zinc oxide, lithium oxide, a composite thereof or the like. In addition, one or two or more element(s) selected from nitrogen, boron and sulfur may be added to the metal oxide, for example, in an amount of 0.1 to 5 mass %. This may improve the electrical conductivity of the metal oxide.

The negative electrode active material may comprise one kind or two or more kinds.

(Negative Electrode Binder)

The negative electrode binder is not particularly limited, but for example, polyacrylic acid (PAA), polyacrylic acid ester, styrene butadiene rubber (SBR), polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polystyrene, polyacrylonitrile and the like may be used. A mixture composed of a plurality of the above resins, a copolymer thereof, styrene butadiene rubber (SBR) which is a cross-linked product thereof and the like are exemplified. A thickener such as carboxymethyl cellulose (CMC) may also be used in combination. Among these, from the viewpoint of excellent binding properties, it is preferable to comprise at least one selected from the group consisting of a combination of SBR and CMC, a polyacrylic acid and a polyimide, and it is more preferable to comprise a polyacrylic acid or a polyimide.

The content of the negative electrode binder is not particularly limited, but from the viewpoint of "sufficient binding property" and "high energy production" being in a trade-off relation with each other, the content based on the total mass of 100 mass % of the negative electrode active material is preferably 0.1 mass % or more, more preferably 0.5 mass % or more, further preferably 1 mass % or more, and it is preferably 20 mass % or less, more preferably 15 mass % or less.

Hereinafter, as one aspect of the present example embodiment, polyacrylic acid that may be used as a negative electrode binder will be described in detail, but the present invention is not limited thereto.

The polyacrylic acid comprises a (meth)acrylic acid monomer unit represented by the following formula (11). In the present specification, the term "(meth)acrylic acid" means acrylic acid and methacrylic acid.

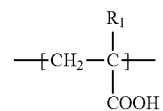

(11)

wherein in formula (11), $R_1$ is a hydrogen atom or a methyl group.

The carboxylic acid in the monomer unit represented by the formula (11) may be a carboxylic acid salt such as a metal salt of a carboxylic acid. The metal is preferably a monovalent metal. Examples of the monovalent metal include alkali metals (for example, Na, Li, K, Rb, Cs, Fr and the like) and noble metals (for example, Ag, Au, Cu and the like). When the polyacrylic acid comprises a carboxylic acid salt in at least a part of the monomer units, the adhesion to the constituent material of the electrode mixture layer may be further improved in some cases.

The polyacrylic acid may comprise other monomer units. When the polyacrylic acid further comprises monomer units other than the (meth)acrylic acid monomer unit, the peel strength between the electrode mixture layer and the current collector may be improved in some cases. As other monomer units, monomer units derived from monomers including ethylenically unsaturated carboxylic acids including monocarboxylic acid compounds such as crotonic acid and pentenoic acid, dicarboxylic acid compounds such as itaconic acid and maleic acid, sulfonic acid compounds such as vinyl sulfonic acid, and phosphonic acid compounds such as vinyl phosphonic acid; aromatic olefins having acidic groups such as styrene sulfonic acid and styrene carboxylic acid; (meth)acrylic acid alkyl esters; acrylonitrile; aliphatic olefins such as ethylene, propylene and butadiene; aromatic olefins such as styrene may be exemplified. Other monomer unit(s) may be a monomer unit constituting a known polymer used as a binder for a secondary battery. In these monomer units, if present, the acids may be also replaced with their salts.

Furthermore, in the polyacrylic acid, at least one hydrogen atom in the main chain and side chain may be substituted with halogen (fluorine, chlorine, boron, iodine and the like).

When the polyacrylic acid is a copolymer comprising two or more kinds of monomer units, the copolymers may be a random copolymer, an alternating copolymer, a block copolymer, a graft copolymer and the like, or combinations thereof.

As for the amount of the polyacrylic acid used in the negative electrode based on 100 parts by mass of the negative electrode active material, the lower limit thereof is preferably 1 part by mass or more and more preferably 2 parts by mass or more, and the upper limit thereof is preferably 20 parts by mass or less and more preferably 10 parts by mass or less. Other binders may be used in combination with the polyacrylic acid.

To the negative electrode, an electrically conductive agent may be added for the purpose of reducing the impedance. Examples of the electrically conductive agent include scaly or fibrous carbonaceous fine particles and the like, such as graphite, carbon black, acetylene black, ketjen black, vapor grown carbon fiber and the like.

As the negative electrode current collector, aluminum, nickel, stainless steel, chromium, copper, silver, and alloys thereof are preferred from the viewpoint of electrochemical stability. Examples of its shape include foil, a flat plate shape, and a mesh shape.

The negative electrode according to the present example embodiment may be prepared by preparing a slurry comprising a negative electrode active material, a binder and a solvent, and applying the slurry onto a negative electrode current collector to form the negative electrode mixture layer. The coating may be carried out by a doctor blade method, a die coater method, a CVD method, a sputtering method or the like.

Separator

The separator may be of any type as long as it suppresses electric conduction between the positive electrode and the negative electrode, does not inhibit the permeation of charged substances, and has durability against the electrolyte solution. Specific examples of the materials include polyolefins such as polypropylene and polyethylene; cellulose, polyethylene terephthalate, polyimide, polyvinylidene fluoride; and aromatic polyamides (aramid) such as polymetaphenylene isophthalamide, polyparaphenylene terephthalamide and copolyparaphenylene-3,4'-oxydiphenylene terephthalamide; and the like. These may be used as a porous film, a woven fabric, a nonwoven fabric and the like.

Insulation Layer

An insulation layer may be formed on at least one surface of the positive electrode, the negative electrode and the separator. Examples of a method for forming the insulation layer include a doctor blade method, a clip coating method, a die coater method, a CVD method, a sputtering method and the like. The insulation layer may be formed at the same time as forming the positive electrode, the negative electrode, or the separator. Examples of materials constituting the insulation layer include a mixture of aluminum oxide, barium titanate or the like and SBR or PVDF.

Structure of Lithium Ion Secondary Battery

Figure 2:
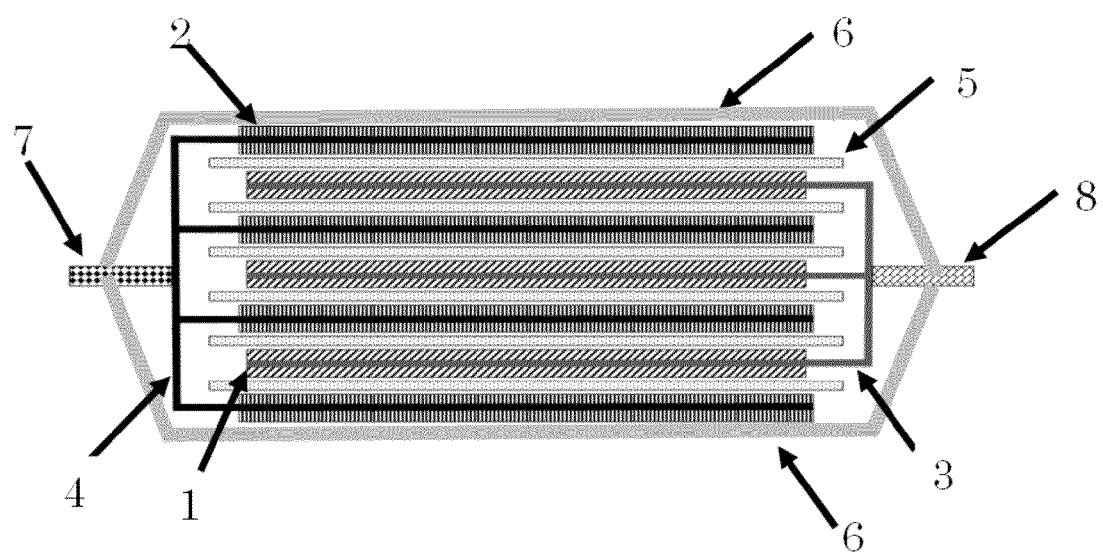
FIG. 2 is a schematic sectional view showing a structure of an electrode element of a stacking laminate type secondary battery.

FIG. 1 shows a laminate-type secondary battery as an example of a secondary battery according to the present example embodiment. The separator 5 is sandwiched between a positive electrode comprising a positive electrode active material layer 1 containing a positive electrode active material and a positive electrode current collector 3 and a negative electrode comprising a negative electrode active material layer 2 and a negative electrode current collector 4. The positive electrode current collector 3 is connected to the positive electrode lead terminal 8 and the negative electrode current collector 4 is connected to the negative electrode lead terminal 7. The exterior laminate 6 is used for the outer package, and the interior of the secondary battery is filled with an electrolyte solution. The electrode element (also referred to as "battery element" or "electrode laminate") preferably has a structure in which a plurality of positive electrodes and a plurality of negative electrodes are stacked via separators, as shown in FIG. 2.

Examples of the laminate resin film used in a laminate type include aluminum, aluminum alloy, titanium foil and the like. Examples of the material of the thermally bondable portion of the metal laminate resin film include thermoplastic polymer materials, such as polyethylene, polypropylene, and polyethylene terephthalate. In addition, each of the numbers of the metal laminate resin layers and the metal foil layers is not limited to one and may be two or more.

Figure 3:
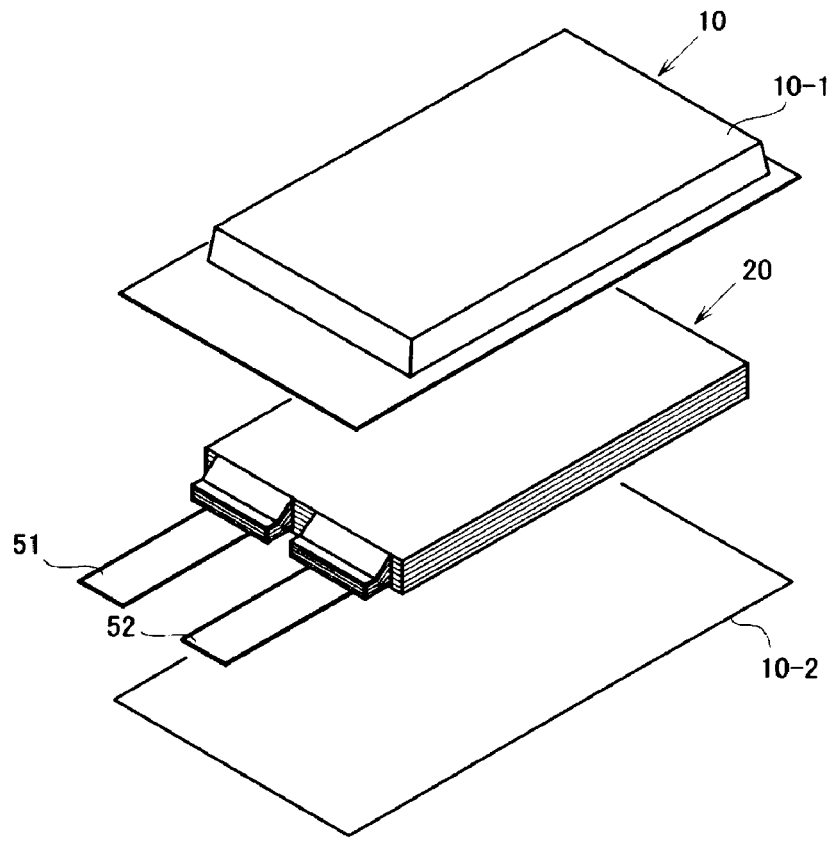
FIG. 3 is an exploded perspective view showing a basic structure of a film-packaged battery.
Figure 4:
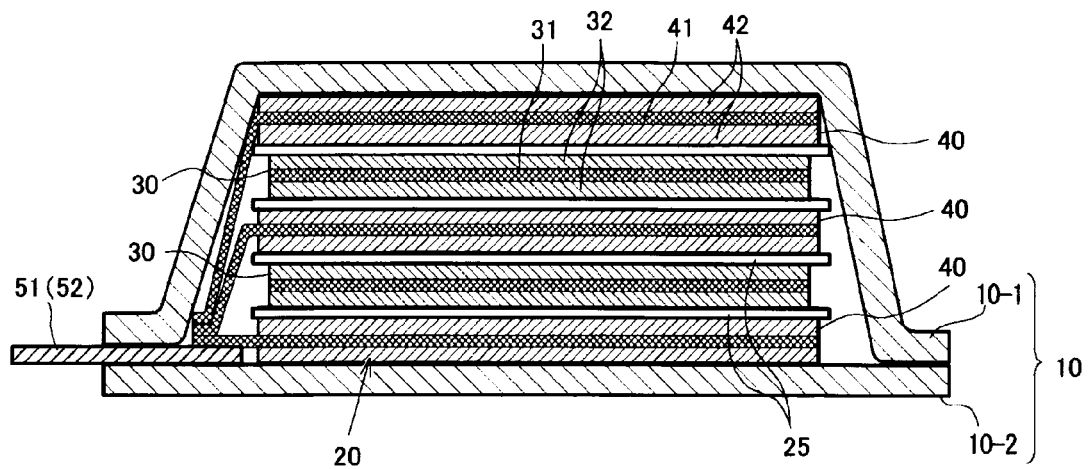
FIG. 4 is a sectional view schematically showing a section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the outer package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

Method for Manufacturing Lithium Ion Secondary Battery

The lithium ion secondary battery according to the present example embodiment can be manufactured according to a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

Assembled Battery

A plurality of lithium ion secondary batteries according to the present example embodiment may be combined to form an assembled battery. The assembled battery may be configured by connecting two or more lithium ion secondary batteries according to the present example embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

Vehicle

The lithium ion secondary battery or the assembled battery according to the present example embodiment can be used in vehicles. Examples of the vehicle according to an embodiment of the present invention include hybrid vehicles, fuel cell vehicles, electric vehicles (besides four-wheel vehicles (cars, trucks, commercial vehicles such as buses, light automobiles, etc.), two-wheeled vehicle (bike) and tricycle), and the like. The vehicles according to the present example embodiment is not limited to automobiles, it may be a variety of power source of other vehicles, such as a moving body like a train.

EXAMPLES

Hereinafter, an embodiment of the present invention will be explained in details by using examples, but the present invention is not limited to these examples.

Abbreviations used in the following Examples and Comparative Examples will be described.

Supporting Salt

LiFSI: $LiN(FSO_2)_2$

Electrolyte Solvent (Cyclic Carbonate)
  EC: ethylene carbonate
  PC: propylene carbonate
(Open-Chain Carbonate)
  DEC: diethyl carbonate
(Fluorinated Ether)
  FE-1: 1,1,2,2-tetrafluoroethyl-2,2,3,3-tetrafluoropropyl ether
  FE-2: ethyl 1,1,2,3,3,3-hexafluoropropyl ether
(Fluorinated Phosphoric Acid Ester)
  TTFEP: tris(2,2,2-trifluoroethyl) phosphate Additive 5MDD: 5-methyl-1,3-dioxolane-2,4-dione
FEC: fluoroethylene carbonate (4-fluoro-1,3-dioxolan-2-one)

Example A

Example A1

(Production of Positive Electrode)

A positive electrode mixture was prepared by uniformly mixing 93 mass % of lithium-rich lithium manganate represented by $Li_{1.15}Ni_{0.3}Mn_{0.55}O_2$ as the positive electrode active material (also referred to as "Mn213"), 3 mass % of polyvinylidene fluoride (PVdF) as the positive electrode binder, 3 mass % of a spherical carbon and 1 mass % of a flaky carbon as the electrically conductive agents. The positive electrode mixture was dispersed in N-methyl-2-pyrrolidone (NMP) to prepare a positive electrode mixture slurry. This positive electrode mixture slurry was uniformly applied to one surface of an aluminum current collector having a thickness of 20 μm. After drying it at about 120° C., it was compression-molded by a press machine using a punching die to produce a rectangular positive electrode (26 mm×28 mm). The obtained positive electrode had a coating weight of 23.2 $g/cm^2$ and a density of 3.0 $g/cm^3$.

(Production of Negative Electrode)

A negative electrode mixture was prepared by uniformly mixing 90 mass % of carbon-coated silicon oxide (coated carbon:silicon oxide (mass ratio)=5:95) (SiOC) having a 50% particle diameter D50 of 5 μm as the negative electrode active material, 8 mass % of a polyacrylic acid (PAA) as the binder and 2 mass % of a fibrous carbon as the electrically conductive agent. The prepared negative electrode mixture was dispersed in water to prepare a negative electrode mixture slurry. This negative electrode mixture slurry was uniformly applied to one surface of a SUS foil having a thickness of 8 μm. After drying it at about 50° C., it was molded using a punching die to produce a rectangular negative electrode (28 mm×30 mm). The obtained negative electrode had a coating weight of 3.1 $g/cm^2$ and a density of 1.3 $g/cm^3$.

(Preparation of Electrolyte Solution)

PC (70% by volume) and FE-1 (30% by volume) were mixed to prepare a nonaqueous solvent. In the nonaqueous solvent, $LiPF_6$ as the supporting salt and 5MDD as the additive were dissolved so that the contents thereof in the electrolyte solution are 1.2 mol/L and 1 mass % respectively to prepare the electrolyte solution.

(Production of Lithium Ion Secondary Battery)

The current collector drawing terminals of the positive electrode and negative electrode were ultrasonically welded with an aluminum (Al) tab on the positive electrode and a nickel (Ni) tab on the negative electrode, respectively. The positive electrode and the negative electrode were stacked with a separator (cellulose, thickness is 20 μm) interposed therebetween so that the surface coated with the positive electrode mixture and the surface coated with the negative electrode mixture face each other, and then the stacking laminate was enclosed in an aluminum (Al) laminate exterior film. The ratio of negative electrode capacity/positive electrode capacity was 1.3. Three sides of the exterior film other than the liquid injection port were heat-welded and vacuum-dried for a whole day and night. After drying it, the prepared electrolyte solution was injected so that the volume thereof was 1.4 times the total void volumes of the positive electrode, the negative electrode and the separator. The liquid injection port was thermally welded to produce a stacked lithium ion secondary battery.

(Evaluation of Lithium Ion Secondary Battery)
(Initial Charge and Discharge and Gas Emission)

Under an environment of 45° C., a cycle of constant current charging at a current value of 0.1 C up to 4.5 V and subsequent constant current discharging at a current value of 0.1 C down to 1.5 V was repeated four times (wherein C is a unit indicating relative current amount, and 0.1 C means a current value at which discharge at a constant current of a battery having a nominal capacity completes in exactly 10 hours). The thickness of the secondary battery before charge and discharge and the thickness of the secondary battery after 4 cycles were measured using a micrometer. Table 2 shows "initial battery thickness expansion ratios" which are the results calculated by the following formula:

100×(thickness after 4 cycles−thickness before charge and discharge)/thickness before charge and discharge.

Thereafter, one side of the heat-sealed laminated exterior film was opened, and the gas generated by charge and discharge was exhausted under vacuum.

(Cycle Test)

After constant current charging at a current value of 0.2 C was performed up to 4.5 V, the AC impedance was measured from 200 kHz to 0.1 Hz at a voltage amplitude of 5 mV. After the measurement, a constant current discharge at a current value of 0.3 C was performed down to 1.5 V. This cycle of constant current charging and constant current discharging was repeated 100 times, and Rsol (electronic resistance) after the 100th cycle of the constant current charging was measured. The results are shown in Table 2. As the resistance value at the 100th cycle is smaller, the resistance rise is smaller, which means such battery is suitable for long-term cycle use. Further, the ratio of the capacity at the 100th cycle to the capacity at the first cycle is shown in Table 2 as a capacity retention ratio.

Examples A2 to A9, Comparative Examples a1 to a7

A lithium ion secondary battery was produced and evaluated in the same manner as in Example A1 except that the composition of the electrolyte solution was changed as shown in Table 2. The results are shown in Table 2.

Example B

Example B1

(Production of Positive Electrode)

A positive electrode mixture was prepared by uniformly mixing 94.97 mass % of lithium nickel cobalt aluminum composite oxide (also referred to as "NCA") represented by $LiNi_{0.8}Co_{0.15}Al_{0.05}O_2$ as the positive electrode active material, 2 mass % of polyvinylidene fluoride (PVdF) as the positive electrode binder, 2 mass % of a spherical carbon and 1 mass % of a flaky carbon as the electrically conductive agents, and 0.03 mass % of oxalic acid as a pH adjuster of the mixture slurry. The positive electrode mixture was dispersed in NMP to prepare a positive electrode mixture slurry. This positive electrode mixture slurry was uniformly applied to one surface of an aluminum current collector having a thickness of 20 μm. After drying it at about 120° C., it was compression-molded by a press machine using a punching die to produce a rectangular positive electrode (26 mm×28 mm). The obtained positive electrode had a coating weight of 28.7 g/cm² and a density of 3.4 g/cm³.

(Production of Negative Electrode)

A negative electrode mixture was prepared by uniformly mixing 95 mass % of carbon-coated silicon oxide (coated carbon:silicon oxide (mass ratio)=5:95) (SiOC) having a 50% particle diameter D50 of 5 μm as the negative electrode active material and 5 mass % of a polyacrylic acid (PAA) as the binder. The prepared negative electrode mixture was dispersed in water to prepare a negative electrode mixture slurry. This negative electrode mixture slurry was uniformly applied to one surface of a SUS foil having a thickness of 8 μm. After drying it at about 50° C., it was compression-molded by a press machine using a punching die to produce a rectangular negative electrode (28 mm×30 mm). The obtained negative electrode had a coating weight of 3.2 g/cm² and a density of 1.3 g/cm³.

(Preparation of Electrolyte Solution)

An electrolyte solution was prepared in the same manner as in Example A1, except that the nonaqueous solvent, the supporting salt and the additive contained in the electrolyte solution were changed as shown in Table 2.

(Production of Lithium Ion Secondary Battery)

A lithium ion secondary battery was produced in the same manner as in Example A1, except that the positive electrode, the negative electrode, and the electrolyte solution as described above were used.

(Evaluation of Lithium Ion Secondary Battery)
(Initial Charge and Discharge and Gas Emission)

Under an environment of 45° C., a cycle of constant current charging at a current value of 0.1 C up to 4.15 V and subsequent constant current discharging at a current value of 0.1 C down to 2.8 V was repeated two times. The thickness of the secondary battery before charge and discharge and the thickness of the secondary battery after 2 cycles were measured using a micrometer. Table 2 shows "initial battery thickness expansion ratios" which are the results calculated by the following formula:

100×(thickness after 2 cycles−thickness before charge and discharge)/thickness before charge and discharge.

Thereafter, one side of the heat-sealed laminated exterior film was opened, and the gas generated by charge and discharge was exhausted under vacuum.

(Cycle Test)

After constant current charging at a current value of 0.3 C up to 4.15 V and subsequent constant voltage charging to 0.05 C were performed, the AC impedance was measured from 200 kHz to 0.1 Hz at a voltage amplitude of 5 mV. After the measurement, a constant current discharging at a current value of 0.3 C was performed down to 2.8 V. This constant current charging and constant current discharging were repeated 100 times. Rct (charge transfer resistance) after constant current charging at the 100th cycle was measured. The results are shown in Table 2. As the resistance value at the 100th cycle is smaller, the resistance rise is smaller, which means such battery is suitable for long-term cycle use. Further, the ratio of the capacity at the 100th cycle to the capacity at the first cycle is shown in Table 2 as a capacity retention ratio.

Example B2, Comparative Examples b1 and b2

A lithium ion secondary battery was produced and evaluated in the same manner as in Example B1 except that the composition of the electrolyte solution was changed as shown in Table 2. The results are shown in Table 2.

TABLE 2

| | positive electrode/ negative electrode | supporting salt | | nonaqueous solvent | | | | | additive | | characteristics | | |
|---|---|---|---|---|---|---|---|---|---|---|---|---|---|
| | | LiPF$_6$ (mol/L) | LiFSI (mol/L) | EC (vol %) | PC (vol %) | TTFEP (vol %) | FE-1 (vol %) | FE-2 (vol %) | DEC (vol %) | 5MDD (wt %) | FEC (wt %) | initial battery thickness expansion ratio (%) | capacity retention ratio after 100 cycles (%) | resistance value after 100 cycles (Ω) |
| Ex. A1 | Mn213/ | 1.2 | | | 70 | 30 | | | | 1 | | 2.3 | 90.0 | 0.51 |
| Ex. A2 | SiO | 1.2 | | | 70 | 30 | | | | 2 | | 2.1 | 90.0 | 0.47 |
| Com. Ex. a1 | | 1.2 | | | 70 | 30 | | | | | | 3.9 | 89.2 | 0.54 |
| Ex. A3 | | 0.6 | 0.6 | | 70 | 30 | | | | 1 | | 2.3 | 91.7 | 0.50 |
| Ex. A4 | | 0.6 | 0.6 | | 70 | 30 | | | | 2 | | 2.1 | 92.7 | 0.49 |
| Com. Ex. a2 | | 0.6 | 0.6 | | 70 | 30 | | | | | | 3.1 | 91.4 | 0.51 |
| Ex. A5 | | 0.8 | | 20 | | 30 | 50 | | | 1 | | 2.1 | 95.3 | 0.57 |
| Ex. A6 | | 0.8 | | 20 | | 30 | 50 | | | 2 | | 1.8 | 95.5 | 0.58 |
| Com. Ex. a3 | | 0.8 | | 20 | | 30 | 50 | | | | | 2.4 | 95.0 | 0.63 |
| Ex. A7 | | 0.4 | 0.4 | 20 | | 30 | 50 | | | 1 | | 2.1 | 92.5 | 0.59 |
| Ex. A8 | | 0.4 | 0.4 | 20 | | 30 | 50 | | | 2 | | 1.8 | 92.6 | 0.62 |
| Com. Ex. a4 | | 0.4 | 0.4 | 20 | | 30 | 50 | | | | | 2.3 | 92.3 | 0.63 |
| Ex. A9 | | 0.6 | 0.6 | | 70 | | | 30 | | 1 | | 1.8 | 89.7 | 0.49 |
| Com. Ex. a5 | | 0.6 | 0.6 | | 70 | | | 30 | | | | 2.1 | 88.6 | 0.84 |
| Ex. A3 | | 0.6 | 0.6 | | 70 | 30 | | | | 1 | | 2.3 | 91.7 | 0.50 |
| Com. Ex. a6 | | 0.6 | 0.6 | | 70 | | | | 30 | 1 | | 2.4 | 87.7 | 0.52 |
| Com. Ex. a7 | | 0.6 | 0.6 | | 70 | 30 | | | | | 1 | 2.1 | 91.0 | 0.51 |
| Ex. B1 | NCA/ | 0.6 | 0.6 | | 70 | 30 | | | | 1 | | 2.3 | 93.4 | 0.79 |
| Ex. B2 | SiO | 0.6 | 0.6 | | 70 | 30 | | | | 2 | | 2.1 | 92.9 | 0.87 |
| Com. Ex. b1 | | 0.6 | 0.6 | | 70 | 30 | | | | | | 2.6 | 92.1 | 0.89 |
| Com. Ex. b2 | | 1.2 | | | 70 | 30 | | | | | | 3.1 | 91.4 | 1.23 |

Ex. = Example,
Com. Ex. = Comparative Example

It is shown that whichever electrode is used, when an electrolyte solution containing a fluorinated ether and 5MDD that is a cyclic dicarboxylic acid ester is used, the lithium ion secondary battery excellent in the balance of suppression of battery expansion ratio at the initial charge and discharge, improvement of capacity retention ratio and suppression of increase in resistance value can be obtained.

The whole or part of the example embodiments disclosed above can be described as, but not limited to, the following supplementary notes.

(Supplementary Note 1)

An electrolyte solution for a lithium ion secondary battery comprising a fluorinated ether and a cyclic dicarboxylic acid ester.

(Supplementary Note 2)

The electrolyte solution for a lithium ion secondary battery according to the supplementary note 1, further comprising LiPF$_6$ and/or LiN(FSO$_2$)$_2$.

(Supplementary Note 3)

The electrolyte solution for a lithium ion secondary battery according to the supplementary note 1 or 2, wherein the content of the fluorinated ether in the electrolyte solution is 1 to 80 vol %.

(Supplementary Note 4)

The electrolyte solution for a lithium ion secondary battery according to any one of the supplementary notes 1 to 3, wherein the content of the cyclic dicarboxylic acid ester in the electrolyte solution is 0.1 mass % or more and 5 mass % or less.

(Supplementary Note 5)

The electrolyte solution for a lithium ion secondary battery according to any one of the supplementary notes 1 to 4, further comprising at least one compound selected from the group consisting of a cyclic carbonate, an open-chain carbonate and a fluoride thereof.

(Supplementary Note 6)

The electrolyte solution for a lithium ion secondary battery according to any one of the supplementary notes 1 to 5, wherein the fluorinated ether is represented by the following formula (1-1);

$$C_nH_{2n+1-l}F_l\text{—O—}C_mH_{2m+1-k}F_k \quad (1\text{-}1)$$

wherein n and m are each independently an integer of 1 to 6, l is an integer of 0 to 2n+1; k is an integer of 0 to 2m+1, and at least one of l and k is 1 or more.

(Supplementary Note 7)

The electrolyte solution for a lithium ion secondary battery according to any one of the supplementary notes 1 to 6, wherein the cyclic dicarboxylic acid ester is at least one compound selected from the group consisting of cyclic dicarboxylic acid esters represented by formula (2) and formula (3):

in formula (2), R$_1$ and R$_2$ each independently represent a single bond or a substituted or unsubstituted alkylene group having 1 to 5 carbon atoms which may be branched, with the proviso that both R$_1$ and R$_2$ do not represent single bonds at the same time;

in formula (3), $R_3$ and $R_4$ each independently represent a single bond or a substituted or unsubstituted alkylene group having 1 to 5 carbon atoms which may be branched, with the proviso that both $R_3$ and $R_4$ do not represent single bonds at the same time.

(Supplementary Note 8)

A lithium ion secondary battery comprising the electrolyte solution for a lithium ion secondary battery according to any one of the supplementary notes 1 to 7.

(Supplementary Note 9)

The lithium ion secondary battery according to the supplementary note 8, further comprising a negative electrode comprising a negative electrode active material comprising silicon as a constituent element.

(Supplementary Note 10)

The lithium ion secondary battery according to the supplementary note 8 or 9, further comprising a positive electrode comprising at least one compound selected from the group consisting of positive electrode active materials represented by the following formulae (A1), (A2) and (B):

$$\text{Li}(\text{Li}_x\text{M}_{1-x-z}\text{Mn}_z)\text{O}_2 \quad (A1)$$

in formula (A1), $0.1 \leq x < 0.3$, $0.4 \leq z \leq 0.8$, M is at least one element selected from the group consisting of Ni, Co, Fe, Ti, Al and Mg;

$$\text{Li}_y\text{Ni}_{(1-x)}\text{M}_x\text{O}_2 \quad (A2)$$

in formula (A2), $0 \leq x < 1$, $0 < y \leq 1$, and M is at least one element selected from the group consisting of Li, Co, Al, Mn, Fe, Ti, and B;

$$\text{Li}_a(\text{M}_x\text{Mn}_{2-x-y}\text{Y}_y)(\text{O}_{4-w}\text{Z}_w) \quad (B)$$

in formula (B), $0.4 \leq x \leq 1.2$, $0 \leq y$, $x+y<2$, $0 \leq a \leq 1.2$, $0 \leq w \leq 1$; M is a transition metal element and comprises at least one element selected from the group consisting of Co, Ni, Fe, Cr and Cu; Y is a metal element and comprises at least one element selected from the group consisting of Li, B, Na, Al, Mg, Ti, Si, K and Ca; and Z is at least one element selected from the group consisting of F and Cl.

(Supplementary Note 11)

A method of producing a lithium ion secondary battery comprising:

stacking a positive electrode and a negative electrode via a separator to produce an electrode element, and enclosing the electrode element and an electrolyte solution in an outer package, wherein the electrolyte solution comprises a fluorinated ether and a cyclic dicarboxylic acid ester.

(Supplementary Note 12)

An assembled battery comprising the lithium ion secondary battery according to any one of the supplementary notes 8 to 10.

(Supplementary Note 13)

A vehicle comprising the lithium ion secondary battery according to any one of the supplementary notes 8 to 10.

This application is based upon and claims the benefit of priority from Japanese patent application No. 2017-098996, filed on May 18, 2017, the disclosure of which is incorporated herein in its entirety by reference.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present example embodiment can be utilized in various industrial fields that require for an electric power source and in an industrial field concerning transportation, storage and supply of electric energy. Specifically, it can be utilized for, for example, an electric power source of a mobile device such as a mobile phone and a notebook computer; an electric power source of a moving or transport medium including an electric vehicle such as an electric car, a hybrid car, an electric motorcycle and an electric power-assisted bicycle, a train, a satellite and a submarine; a back-up electric power source such as UPS; and an electric power storage device for storing an electric power generated by solar power generation, wind power generation, and the like.

EXPLANATION OF REFERENCE 1 positive electrode active material layer
2 negative electrode active material layer
3 positive electrode current collector
4 negative electrode current collector
5 separator
6 exterior laminate
7 negative electrode lead terminal
8 positive electrode lead terminal
10 film outer package
20 battery element
25 separator
30 positive electrode
40 negative electrode

The invention claimed is:

1. A lithium ion secondary battery comprising:
an electrolyte solution comprising a fluorinated ether and a cyclic dicarboxylic acid ester,
a positive electrode, and
a negative electrode comprising a negative electrode active material comprising silicon as a constituent element,
wherein the cyclic dicarboxylic acid ester comprises a compound represented by the following formula (3-1):

wherein $R_5$ represents a hydrogen atom or a substituted or unsubstituted alkyl group having 1 to 4 carbon atoms,
the positive electrode comprises a positive electrode active material comprising a compound represented by the following formula (A1):

$$\text{Li}(\text{Li}_x\text{M}_{1-x-z}\text{Mn}_z)\text{O}_2 \quad (A1)$$

in formula (A1), $0.1 \leq x < 0.3$, $0.4 \leq z \leq 0.8$, and M is at least one element selected from the group consisting of Ni, Co, Fe, Ti, Al, and Mg, and
a content of the fluorinated ether in the electrolyte solution is 20 vol % or more.

2. The lithium ion secondary battery according to claim 1, wherein the electrolyte solution further comprises $\text{LiPF}_6$ and/or $\text{LiN}(\text{FSO}_2)_2$.

3. The lithium ion secondary battery according to claim 1, wherein the content of the fluorinated ether in the electrolyte solution is 20 vol % to 80 vol %.

4. The lithium ion secondary battery according to claim 1, wherein the content of the cyclic dicarboxylic acid ester in the electrolyte solution is 0.1 mass % or more and 5 mass % or less.

5. The lithium ion secondary battery according to claim 1, wherein the electrolyte solution further comprises at least one compound selected from the group consisting of a cyclic carbonate, an open-chain carbonate and a fluorinated derivative thereof.

6. The lithium ion secondary battery according to claim 1, wherein the fluorinated ether is represented by the following formula (1-1):

$$C_nH_{2n+1-l}F_l\text{---}O\text{---}C_mH_{2m+1-k}F_k \qquad (1\text{-}1)$$

wherein n and m are each independently an integer of 1 to 6, l is an integer of 0 to 2n+1; k is an integer of 0 to 2m+1, and at least one of l and k is 1 or more.

7. The lithium ion secondary battery according to claim 1, wherein the cyclic dicarboxylic acid ester comprises a compound represented by the following formula (3-2):

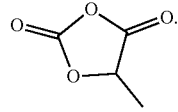
$$(3\text{-}2)$$

8. The lithium ion secondary battery according to claim 7, wherein the electrolyte solution further comprises LiPF$_6$ and/or LiN(FSO$_2$)$_2$.

9. The lithium ion secondary battery according to claim 7, wherein the content of the fluorinated ether in the electrolyte solution is 20 vol % to 80 vol %.

10. The lithium ion secondary battery according to claim 7, wherein the content of the cyclic dicarboxylic acid ester in the electrolyte solution is 0.1 mass % or more and 5 mass % or less.

11. The lithium ion secondary battery according to claim 7, wherein the electrolyte solution further comprises at least one compound selected from the group consisting of a cyclic carbonate, an open-chain carbonate and a fluorinated derivative thereof.

12. The lithium ion secondary battery according to claim 7, wherein the fluorinated ether is represented by the following formula (1-1):

$$C_nH_{2n+1-l}F_l\text{---}O\text{---}C_mH_{2m+1-k}F_k \qquad (1\text{-}1)$$

wherein n and m are each independently an integer of 1 to 6, l is an integer of 0 to 2n+1; k is an integer of 0 to 2m+1, and at least one of l and k is 1 or more.

13. The lithium ion secondary battery according to claim 1, wherein the electrolyte solution further comprises a fluorinated phosphoric acid ester represented by the following formula (4):

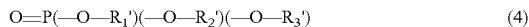
$$O\text{=}P(\text{---}O\text{---}R_1')(\text{---}O\text{---}R_2')(\text{---}O\text{---}R_3') \qquad (4)$$

wherein R$_1$', R$_2$' and R$_3$' each independently represent an alkyl group or a fluorinated alkyl group, and at least one of R$_1$', R$_2$' and R$_3$' is a fluorinated alkyl group.

14. The lithium ion secondary battery according to claim 13, wherein the electrolyte solution further comprises LiPF$_6$ and/or LiN(FSO$_2$)$_2$.

15. The lithium ion secondary battery according to claim 13, wherein the content of the fluorinated ether in the electrolyte solution is 20 vol % to 80 vol %.

16. The lithium ion secondary battery according to claim 13, wherein the content of the cyclic dicarboxylic acid ester in the electrolyte solution is 0.1 mass % or more and 5 mass % or less.

17. The lithium ion secondary battery according to claim 13, wherein the electrolyte solution further comprises at least one compound selected from the group consisting of a cyclic carbonate, an open-chain carbonate and a fluorinated derivative thereof.

18. The lithium ion secondary battery according to claim 13, wherein the fluorinated ether is represented by the following formula (1-1):

$$C_nH_{2n+1-l}F_l\text{---}O\text{---}C_mH_{2m+1-k}F_k \qquad (1\text{-}1)$$

wherein n and m are each independently an integer of 1 to 6, l is an integer of 0 to 2n+1; k is an integer of 0 to 2m+1, and at least one of l and k is 1 or more.

19. A method of producing a lithium ion secondary battery comprising:
stacking a positive electrode and a negative electrode via a separator to produce an electrode element, and
enclosing the electrode element and an electrolyte solution in an outer package, wherein
the electrolyte solution comprises a fluorinated ether and a cyclic dicarboxylic acid ester,
the negative electrode comprises a negative electrode active material comprising silicon as a constituent element, and
the cyclic dicarboxylic acid ester comprises a compound represented by the following formula (3-1):

$$(3\text{-}1)$$

wherein R$_5$ represents a hydrogen atom or a substituted or unsubstituted alkyl group having 1 to 4 carbon atoms, and
the positive electrode comprises a positive electrode active material comprising a compound represented by the following formula (A1):

$$\text{Li}(\text{Li}_xM_{1-x-z}\text{Mn}_z)O_2 \qquad (A1)$$

in formula (A1), 0.1≤x<0.3, 0.4≤z≤0.8, and M is at least one element selected from the group consisting of Ni, Co, Fe, Ti, Al, and Mg, and
a content of the fluorinated ether in the electrolyte solution is 20 vol % or more.

* * * * *